United States Patent [19]
Firey

[11] Patent Number: 5,479,893
[45] Date of Patent: Jan. 2, 1996

[54] COMBINED REACTOR FOR CYCLIC CHAR BURNING ENGINES

[76] Inventor: Joseph C. Firey, P.O. Box 15514, Seattle, Wash. 98115-0514

[21] Appl. No.: 379,914

[22] Filed: Jan. 30, 1995

[51] Int. Cl.$^6$ ..................................... F02B 45/00
[52] U.S. Cl. ......................................... 123/23
[58] Field of Search ................. 123/23; 110/108, 110/109

[56] References Cited

U.S. PATENT DOCUMENTS 4,744,311  5/1988  Piekos ........................... 110/108

FOREIGN PATENT DOCUMENTS 738043  7/1943  Germany ...................... 123/23
887581  7/1953  Germany ...................... 123/23

Primary Examiner—Noah P. Kamen

[57] ABSTRACT

A modified primary reactor for cyclic char burning engines is described wherein the reaction chamber cross sectional area increases in the direction of char fuel motion. Additionally air inlet ports are distributed along the length of the chamber in the direction of char fuel motion in order to supply oxygen to the char fuel reaction throughout the reaction chamber. Porous ceramic chips are mixed with the char fuel and function as air storage reservoirs during compression, and as air supply sources during expansion.

9 Claims, 5 Drawing Sheets

COMBINED REACTOR FOR CYCLIC CHAR BURNING ENGINES

CROSS REFERENCES TO RELATED APPLICATIONS

The invention descried in my U.S. patent application entitled, *Multiple Sources Refuel Mechanism* Ser. No. 08/378,639, filed Jan. 26, 1995, is related to and usable on the invention described in this application. These two related applications are being sent in to the US Patent Office at about the same time.

This application is also related to my following U.S. patent applications:

1. *Reversed Dual Throughflow of Air for Primary Reactors of Cyclic Char Bunzing Engines*, Ser. No. 08/224,723, filed Apr. 8, 1994 now issued as U.S. Pat. No. 5,410,990, as of May 2, 1995.

2. *Unidirectional Dual Throughflow of Air for Primary Reactors of Cyclic Char Burning Engines and Gasifiers*, Ser. No. 08/223,665, filed Apr. 6, 1994 will issue as U.S. Pat. No. 5,417,183, as of May 23, 1995.

BACKGROUND OF THE INVENTION

1. Field of the Invention

This invention is in tile field of internal combustion engines and particularly tile field of internal combustion engines burning solid fuels alone or in combination with liquid or gaseous fuels. The internal combustion engines can be of the piston and cylinder type or equivalent.

2. Description of the Prior Art

Prior art examples of char burning engines of the piston and cylinder type are described in the following U.S. Patents issued to applicant:

U.S. Pat. No. 4,372,256, Feb. 8, 1983
U.S. Pat. No. 4,381,745, May 3, 1983
U.S. Pat. No. 4,412,511, Nov. 1, 1983
U.S. Pat. No. 4,698,069, Oct. 6, 1987
U.S. Pat. No. 4,794,729, Jan. 3, 1989
U.S. Pat. No. 5,109,808, May 5, 1992
U.S. Pat. No. 5,201,283, Apr. 13, 1993
U.S. Pat. No. 5,002,024, Mar. 26, 1991
U.S. Pat. No. 5,085,183, Feb. 4, 1992
U.S. Pat. No. 5,216,982, Jun. 8, 1993

In these example cyclic char burning engines and gasifiers air, or other reactant gas containing appreciable oxygen gas, is compressed into the pore spaces of a solid char fuel, contained within a separate primary reaction chamber, during a compression process and this is followed by expansion of the primary reacted gases, formed by reaction of oxygen with the char fuel, out of the pore spaces of the char fuel during an expansion process. This cycle of compression followed by expansion is repeated. This cycle of compression and expansion is created by a combined apparatus for compressing and expanding, such as a piston operated within a cylinder, wherein the space enclosed by the piston crown and the cylinder walls is a variable volume chamber whose volume varies cyclically when the piston is reciprocated by an internal combustion engine mechanism for driving this combined apparatus for compressing and expanding. Following each expansion process the reacted gases are largely removed from the variable volume chamber by an exhaust apparatus. Fresh air is next supplied into the variable volume chamber by an intake apparatus prior to the next following compression process. Thus an exhaust process followed by an intake process is interposed between each expansion process and the next compression process for a cyclic char burning engine or gasifier as is well known in the art of internal combustion engines. Each compression process occupies a compression time interval which is followed by an expansion process occupying an expansion time interval. The separate primary reaction chamber is contained within a pressure vessel container. A heater for preheating the char fuel within the primary reaction chamber is used to bring the char fuel up to that temperature at which it will react rapidly with oxygen in adjacent compressed gases while the engine or gasifier is being started. Thereafter the heater for preheating the char fuel can be turned off when the heat of the primary reaction becomes sufficient to keep the char fuel at or above this rapid reaction temperature. During starting a cranking mechanism is used to drive the internal combustion engine mechanism. The detailed descriptions of cyclic char burning engines and gasifiers contained in the above listed U.S. Patents are incorporated herein by reference thereto.

The term "char fuels" is used herein and in the claims to mean highly carbonaceous, and largely solid, fuels such as coal, coke, charcoal, petroleum coke, coal char, etc. as well as originally liquid fuels, such as heavy residual petroleum fuels, which leave behind a solid carbonaceous residue after volatile matter has been evolved by heating. Certain of these fuels, such as bituminous coal and green petroleum coke, evolve gaseous components when heated and these evolved gases are herein referred to as "volatile matter." The burnable residue left behind after evolution of volatile matter is herein referred to as "fixed carbon." Most such char fuels contain ash forming ingredients, which are not burnable, and this non burnable residue is herein referred to as "ash."

In these prior art cyclic char burning engines a two stage reaction process is used wherein char fuel gasification by partial oxidation occurs inside the char fuel pore spaces during compression time intervals. For cyclic char burning engines, as distinct from gasifiers, complete burnup of these gasified products to fully burned gases occurs during expansion time intervals in a secondary reaction chamber, equipped with an igniter and supplied with the needed secondary air for this complete burning process. Details of this two stage reaction process are described in the above incorporated references, particularly in U.S. Pat. No. 4,412,511.

A modified form of this two stage reaction process is described in U.S. Pat. No. 4,381,745 wherein a fixed porous ceramic primary reaction chamber is used together with a liquid fuel injector for injecting heavy residual petroleum fuels. The residual petroleum fuel is sprayed on to the outer surface of the porous ceramic early in the compression process and this liquid fuel is then forced by compression deep into the ceramic pore spaces. The primary gasification of the fuel then occurs within the ceramic pore spaces. During expansion the gasified products leave the ceramic pore spaces and are burned in a secondary reaction chamber containing the needed secondary air and an igniter.

As char fuel is reacted to ashes within the primary reactor it is replaced by a refuel mechanism for supplying fresh char fuel into a refuel end of the primary reactor. The char fuel is thus moved along through the primary reactor toward an opposite ash collection end of the primary reactor. Hence the char fuel being reacted within the primary reactor has a direction of motion from the refuel end toward the ash collection end. An ash removal mechanism is used for removing ashes from the primary reaction chamber.

Where air is the reactant gas it is readily available from the atmosphere. In some applications oxygen enriched air or essentially pure oxygen may be used as the reactant gas, as for example in some gasifier uses, and here a source of oxygen rich gas is needed.

The term rapid reaction temperature is used herein and in the claims to mean that temperature of the char fuel at which it will react with the supplied reactant gas containing oxygen gas sufficiently rapidly to maintain the char fuel temperature at or above this rapid reaction temperature due only to the heat of the reaction between the char fuel and this reactant gas. This rapid reaction temperature varies with the kind of char fuel being reacted, the oxygen content of the reactant gas, and the operating conditions prevailing within the char fuel reaction chamber.

For the same reactant gas and operating conditions different char fuels have different rapid reaction temperatures, some charcoals reacting rapidly with air in usual type reactors at temperatures as low as 1200° F. whereas some petroleum coke fuels will only react rapidly with air at temperatures above about 1500° F.

For a particular char fuel and operating condition a higher rapid reaction temperature is required when the oxygen content of the reactant gas is reduced since more of the heat of char and oxygen reaction is diverted to the heating up of non reactive portions of the reactant gas. Below a certain minimum oxygen content the reaction between the char fuel and the oxygen is too slow to sustain itself by its own heat of reaction, and the term appreciable oxygen gas content of reactant is used herein and in the claims to mean an oxygen content greater than this minimum value. Ordinary air, with an oxygen gas content of about 21 volume percent, will usually react readily with most commonly available hot char fuels in reasonably well insulated reaction chambers, and is an example of a reactant gas containing appreciable oxygen gas suitable for use in most gas producers. In some gas producer applications oxygen enriched air or essentially pure oxygen has been used as the reactant gas containing appreciable oxygen gas. Reactant gases containing less oxygen than air, while theoretically useable in engines and gas producers, have rarely, if ever, been so used.

As the char fuel reaction chamber becomes smaller, external heat loss rate increases, and the char fuel must be brought to a higher temperature, and thus higher reaction speed, in order for the char fuel and oxygen gas reaction to be self sustaining. We thus see that the rapid reaction temperature is not a property of the char fuel alone and can only be determined experimentally within the reaction chamber to be used, and with the oxygen containing reactant gas to be used.

In engine applications of cyclic char burning engines and gasifiers, the variable volume chamber of the internal combustion engine may be used as a secondary reaction chamber wherein primary reacted gases from the primary reactor are burned completely with secondary air during the expansion process. For these applications the needed secondary air is retained outside the primary reactor during compression and is admixed with the primary reacted gas emerging from the primary reactor during expansion. The resulting air fuel mixture is then ignited by an igniter within the secondary reactor in the variable volume chamber. Thus this form of cyclic char burning engine requires use of a suitable igniter within the variable volume chamber.

The term means for connecting is used herein and in the claims to mean a passage through which gases may flow. Within some connecting means a unidirectional flow means, such as a check valve, may be inserted so that gas flows always in the same direction through that connection. Check valves or timed, driven, valves, are examples of unidirectional flow means. A connecting means may connect to gas flow openings into or out of the primary reactor and into the reservoirs added thereto.

As the char fuel, within the primary reactor, moves along the char fuel motion direction it is preheated by heat transfer from char fuel portions which are further along and are reacting rapidly with oxygen and thus are at a high temperature. Where the char fuel being used is essentially free of volatile matter, as with coke fuel, this preheat zone serves to bring the new char fuel up to its rapid reaction temperature. The char fuel then enters the rapid reaction zone and carbon reacts therein with oxygen to form producer gas. Beyond the rapid reaction zone in the direction of char fuel motion the char fuel is essentially completely reacted to ashes which pass into an ash collection zone at the end of the char fuel motion path.

In prior art cyclic char burning engines and gasifiers the ashes are removed from the ash collection zone of the primary reactor at the end of the char fuel motion path by an ash removal mechanism. Most such ash removal mechanisms remove a volume of material at intervals and it is necessary to control either the volume, or the interval, or both, so that only ashes, and no burnable char fuel, are removed.

SUMMARY OF THE INVENTION

This invention comprises improvements to the primary reactors of cyclic char burning engines so that full burning of the char fuel to carbon dioxide takes place inside the single primary reaction chamber. For this purpose oxygen needs to be supplied across the entire cross sectional area of the reactor and a zone created where full burning to carbon dioxide can take place in the absence of char fuel and in the presence of sufficient oxygen. Additionally the contents of the primary reaction chamber are maintained under compression to prevent particle bouncing, and the consequent generation of fines which could be carried over into the engine piston and cylinder.

The primary reaction chambers of this invention are tapered with area increasing in the direction of char fuel motion. Air ports are located along the length and around the periphery of the reaction chamber to admit air, not only all along the length and all around the periphery, but also across a major portion of the cross sectional area due to the reaction chamber taper.

The char fuel is premixed with porous ceramic chips before being refueled into the primary reactor. These ceramic chips provide an oxygen path through the fuel bed, store oxygen during compression time intervals, and release oxygen for full burning during expansion time intervals. As the char fuel moves along in the char fuel motion direction it reacts with oxygen to form gas products. Hence ceramic chips, free of solid char fuel, accumulate at the ash collection end of the primary reaction chamber. This char free ceramic chips zone provides a space for final full burning of the gas products to carbon dioxide and water in the absence of any reducing carbon. Nevertheless the primary reaction chamber remains filled with particles and can be maintained under moderate compression by the refuel mechanism in order to prevent particle bouncing and fines generation. Periodically the ceramic chips accumulated at the ash collection end of the primary reactor are removed by the ash removal mechanism.

The flow of reactant air and gases, through the primary reaction chamber, is unidirectional, from the refuel end toward the ash collection end, so that all gas products of the char fuel and oxygen reaction pass through the char free ceramic chips zone for full burnup.

Figure 2:
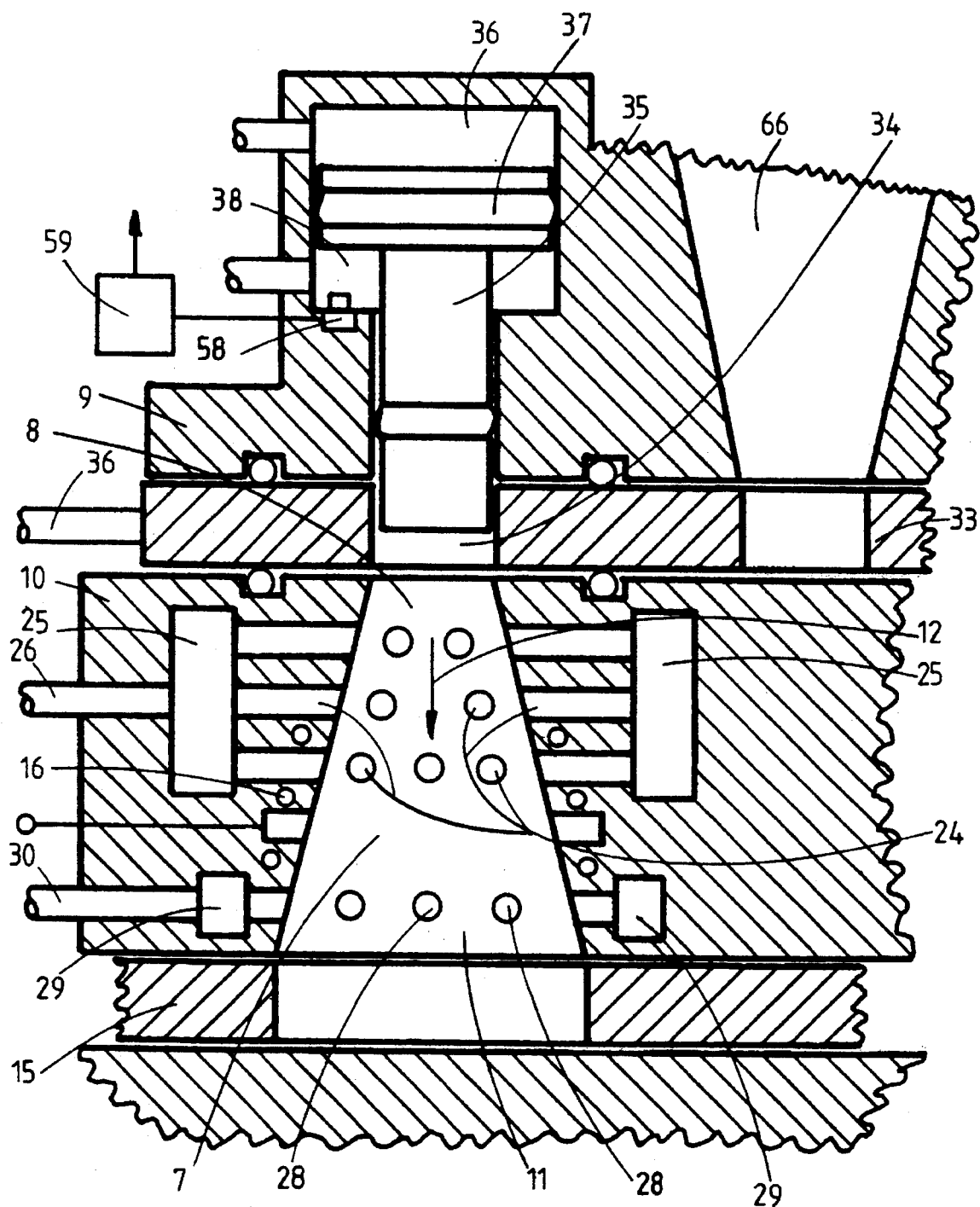

A cross sectional view of one form of refuel mechanism is shown in FIG. 2.

Figure 3:
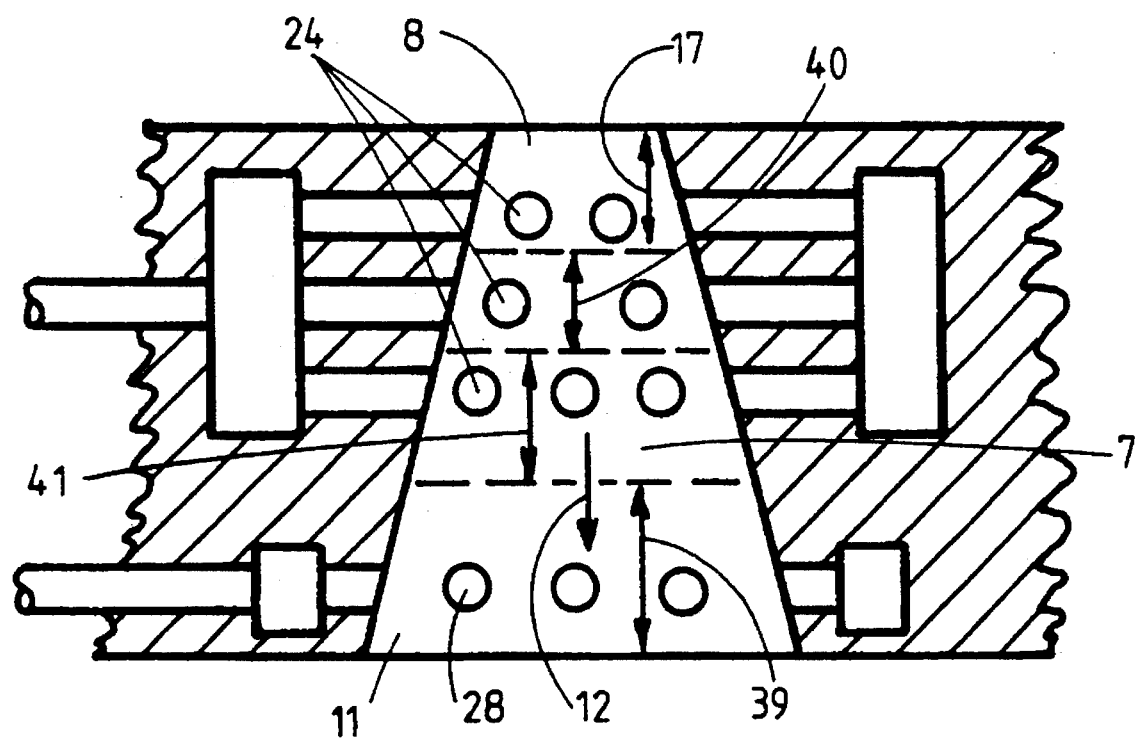

The several reaction zones within the primary reaction chamber are shown in FIG. 3.

Figure 4:
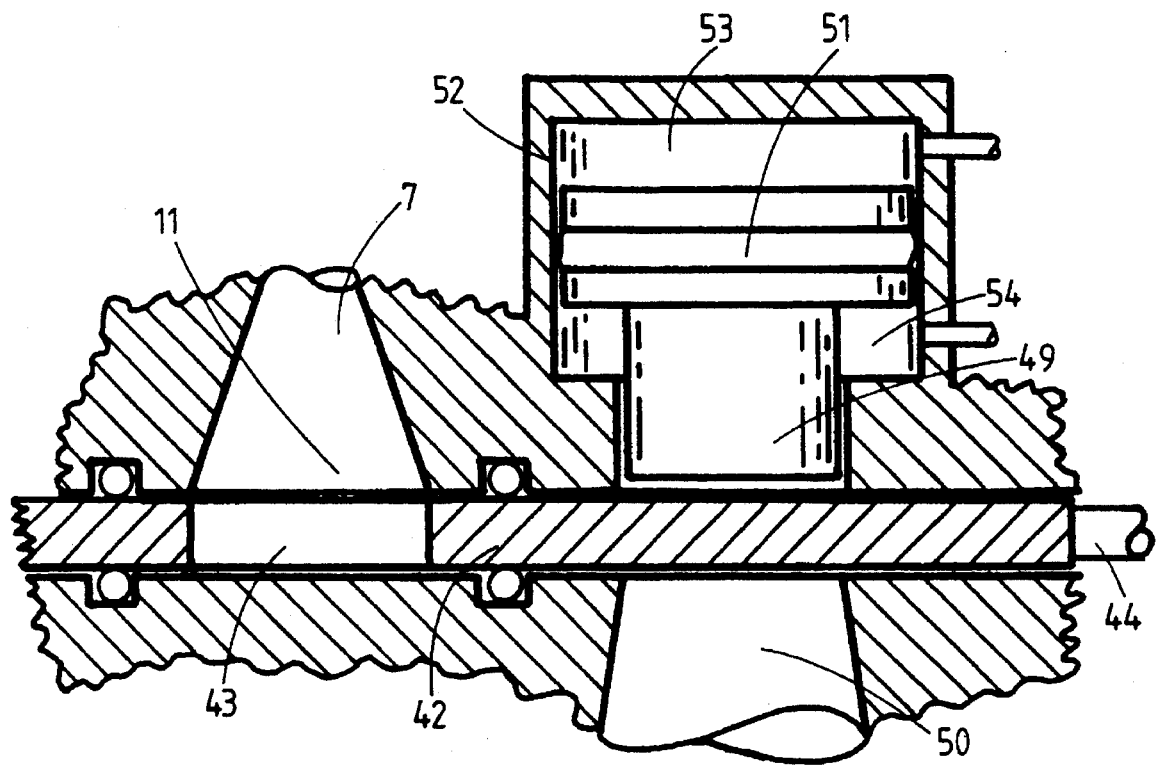
Figure 4:
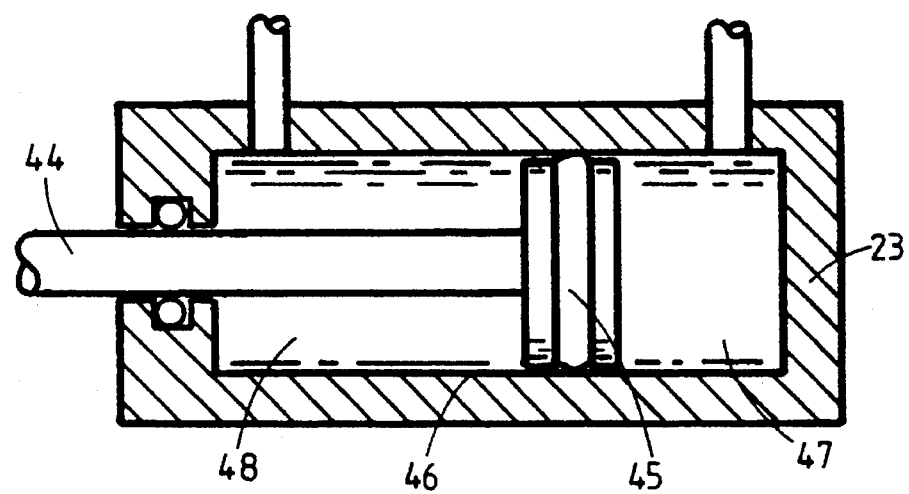

A cross sectional view of one form of ash removal mechanism is shown in FIG. 4.

Figure 5A:
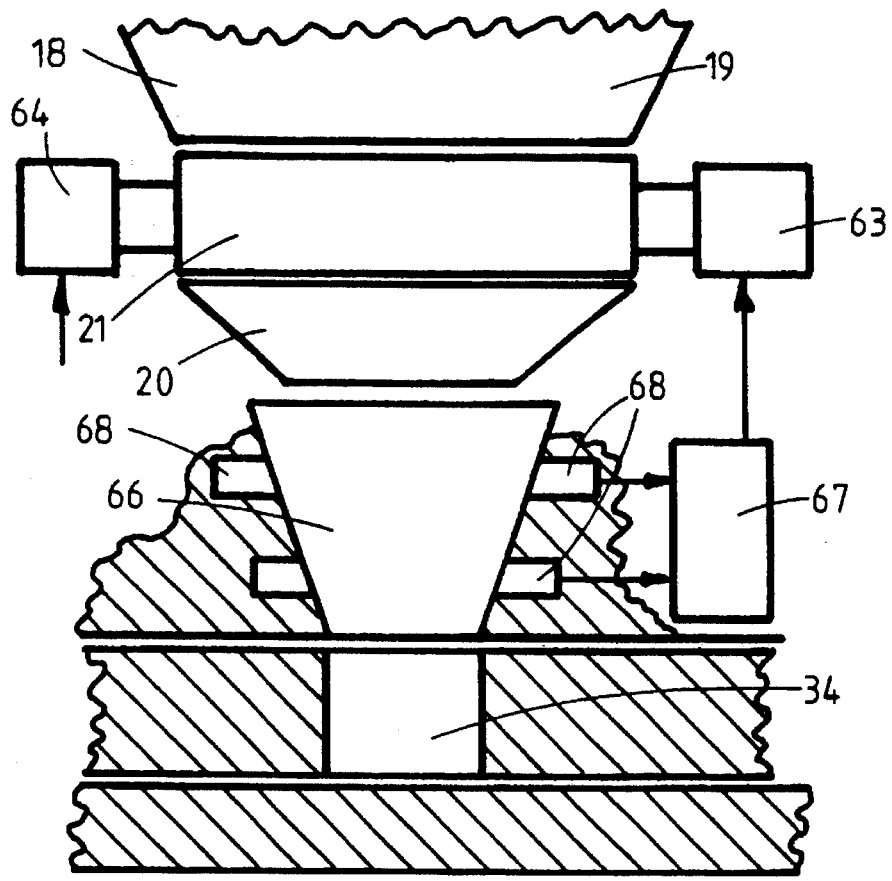
Figure 5B:
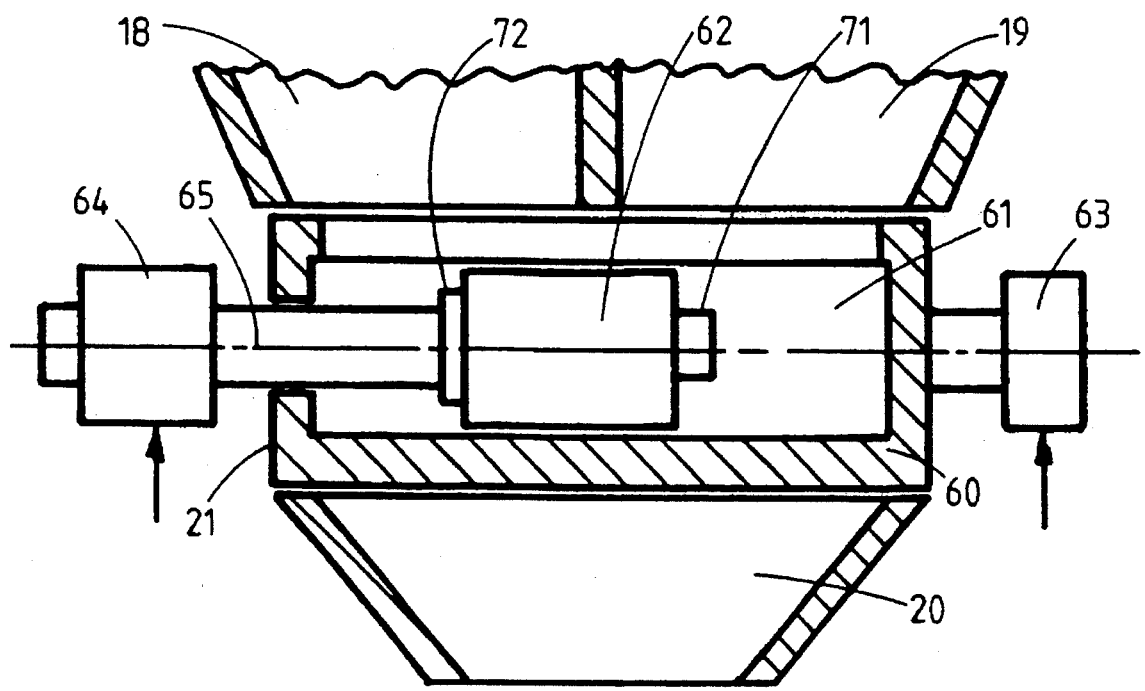

A view of one form of blender for premixing ceramic chips and char fuel chunks together is shown in FIG. 5A and a cross sectional view of a transfer valve details is shown in FIG. 5B.

DESCRIPTION OF THE PREFERRED EMBODIMENTS

A. Char Fuel Tar Problems

When char fuels containing appreciable volatile matter such as bituminous coal are reacted with air to create producer gas, the volatile matter is transformed in part into tar materials. When this producer gas containing tar is passed from a primary producer gas reactor into a secondary complete burnup reactor the tar is partially deposited in the gas flow passages and adjacent surfaces of a cyclic char burning engine. These tar deposits impair proper engine operation, as by clogging flow passages, or sticking piston rings into ring grooves, and frequent engine cleanup is needed increasing maintenance costs.

It has long been known that the tar quantity can be greatly reduced, or largely eliminated, by use of air downflow through the primary producer gas reactor. With air downflow the reactant air and producer gas flow in the same direction as the char fuel motion, that is from refuel end toward ash collection end. In this way the volatile matter emerging from the char fuel in the char fuel preheat zone, toward the refuel end of the primary reactor, is premixed with reactant air there. This volatile matter in air mixture then burns and much or all of the tar is burned up to gaseous products in this volatile matter in air burning zone. But the resultant gases emerging from this volatile matter in air burning zone are consequently greatly depleted of oxygen. Thus in the next following carbon gasification zone, where oxygen is needed to react with carbon to form carbon monoxide, the gasification is very slow due to the small concentration of oxygen available there. In non cyclic, steady pressure gas producers this slowing of the carbon gasification reaction can be offset by use of a deeper bed of char fuel. But in cyclic char burning engines such deeper char fuel beds require a larger engine clearance volume and hence a reduced engine compression ratio with consequently reduced engine efficiency. It is one of the principal beneficial objects of the invention described herein to provide a primary reactor for cyclic char burning engines, which can be of small volume, and yet provide rapid carbon gasification, together with full tar burnup when utilizing high volatile matter char fuels such as bituminous coal.

B. Cyclic Char Burning Engines

Figure 1:
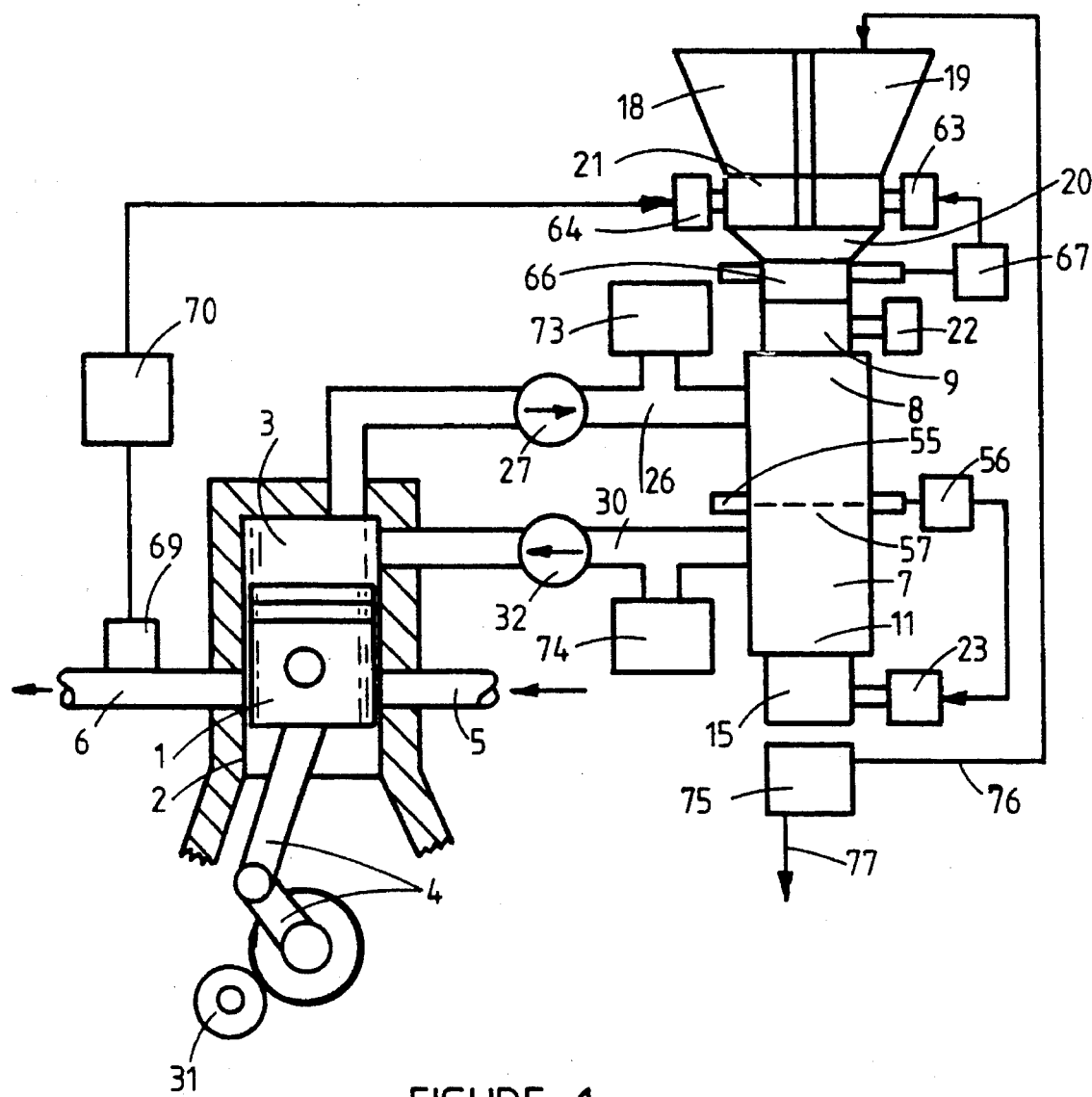
In FIG. 1 is shown a schematic diagram of a primary reactor, as modified in accordance with this invention, and connected to a cyclic char burning engine.

All forms of this invention are improvements to cyclic char burning engines using a separated primary reaction chamber, an example of which is shown schematically in FIGS. 1, 2 and 3, and comprises:

1. A combined apparatus for compressing and expanding gases comprising: a piston, 1; operative within a cylinder, 2; and these enclosing a variable volume chamber, 3; whose volume varies cyclically as the piston is reciprocated by a driver 4. The driver, 4, reciprocates the piston, 1, thus varying the volume of the variable volume chamber, 3, creating a compression process for a compression time interval when the piston, 1, is rising and decreasing the volume of the variable volume chamber 3, and creating an expansion process for an expansion time interval when the piston, 1, is descending and increasing the volume of the variable volume chamber, 3. The combined apparatus for compressing and expanding shown in FIG. 1 further comprises: an intake apparatus, 5, for placing air as reactant gas into the variable volume chamber, 3, prior to each compression process when the piston, 1, is at the bottom portion of its stroke; an exhaust apparatus, 6, for removing reacted gases from the variable volume chamber, 3, after each expansion process when the piston, 1, is again at the bottom portion of its stroke. A two stroke cycle internal combustion engine mechanism is shown in FIG. 1 but four stroke cycle internal combustion engine mechanisms can also be used. Also driver other than the crank and connecting rod mechanism of FIG. 1 can also be used such as the Wankel engine mechanism.

2. A separated primary reaction chamber, 7, contains char fuel which is added into the refuel end, 8, thereof by a refuel mechanism, 9. and this primary reactor comprises: a pressure vessel container, 10, to contain the primary reaction chamber, 7; an ash collection end, 11; a char fuel direction of motion, 12, from the refuel end, 8, toward the ash collection end, 11, in which direction the char fuel moves as it is being reacted and consumed within the primary reactor, 7; an ash removal mechanism, 15, which removes ashes from the ash collection end, 11, of the primary reactor, 7; a starting heater, 16, for preheating the char fuel in the primary reactor, 7, up to that temperature at which it reacts rapidly with oxygen in adjacent compressed reactant gas when the engine is being cranked for starting, by the cranking apparatus, 31. 3. The fresh char fuel refueled into the refuel end, 8, of the primary reactor, 7, is cold, and will not react with compressed air, but is heated by conduction from those char fuel portions deeper into the primary reactor which are at a high temperature and are reacting rapidly with oxygen to create producer gas. Thus the first portion, 17, of the primary reaction chamber along the char fuel motion direction, 12, is a char fuel preheat zone, 17, and distillation of volatile matter takes place here also when char fuels containing volatile matter are being used.

C. Elements of the Invention

The devices of this invention comprise additions to and modifications of the primary reaction chamber, 7, the combined compressor and expander, and the gas flow connecting means therebetween as follows:

4. In addition to a source of char fuel chunks, 18, a source of porous ceramic chips, 19, is provided.

5. A blender for premixing the char fuel chunks and the porous ceramic chips together is interposed between the char fuel and ceramic chips sources, 18, 19, and the refuel mechanism, 9, and is fitted with a apparatus for setting the volumetric ratio of ceramic chips to char fuel chunks, 21. This volumetric ratio is to always exceed the volumetric ratio of char fuel ash content to ceramic chips pore content, and the reciprocal of the volumetric ratio is to always exceed zero. In this way some char fuel and some ceramic chips are both present in the premixed material passing from the sources, 18, 19, into the refuel mechanism, 9.

6. The refuel mechanism, 9, is modified to comprise a apparatus for inserting char fuel chunks and porous ceramic chips together into the refuel end, 8, of the primary reaction chamber, 7, from the blender. The refuel mechanism, 9, has a refuel driver, 22, for driving the apparatus for inserting so that refueling occurs periodically over a refuel process time interval, and so that a compressive force is applied to the contents of the primary reaction chamber, 7, at all times except during the refuel process time interval. By thus maintaining a compression force on the reaction chamber contents, these are prevented from bouncing and thus creating fines, which could carry over into the variable volume chamber, 3, and create wear and deposit problems. One particular example of a refuel mechanism, suitable for use with this invention, is partially shown in FIG. 2, and comprises:

A transfer plate, 33, with at least one refuel cavity, 34, is driven back and forth via the drive bar, 36, by the refuel mechanism driver, 22, so that the refuel cavity, 34, is aligned to both the refuel driver piston, 35, and the refuel end, 8, of the primary reaction chamber, 7, at all times except during a refuel process time interval. The refuel driver piston, 35, applies a continuous compressive force on the contents of the refuel cavity, 34, and thence on the contents of the primary reaction chamber, 7, by application of pressure to the drive side, 36, of the actuator piston, 37. During each refuel process time interval the refuel driver piston, 35, is retracted outside the refuel cavity, 34, by application of pressure to the retract side, 38, of the actuator piston, 37, and the refuel cavity is moved by the drive bar, 36, and driver, 22, into alignment with the blender final receiving hopper, 66, to be refilled with fresh premixed char fuel and ceramic chips. After refilling the refuel cavity, 34, is moved back into alignment with the refuel driver piston, 35, and the compressive force is reapplied.

Other types of refuel mechanisms can also be used with this invention such as are described in the material incorporated by reference.

7. The ash removal apparatus for removing, 15, unburned materials from the ash collection end, 11, of the primary reaction chamber, 7, is modified to comprise apparatus for removing ceramic particles and ashes together from the primary reaction chamber. The ash removal apparatus, 15, has an ash removal driver means, 23, so that removal occurs periodically during an ash removal process time interval.

8. The primary reaction chamber, 7, is modified by being tapered with cross sectional area increasing in the direction of char fuel motion, 12.

9. Several air delivery ports, 24, are distributed along the length and around the periphery of the primary reaction chamber, 7, with outlets into the primary reaction chamber, 7. The inlets to these air delivery ports, 24, are connected together, as via a manifold, 25, to the air inlet connecting means, 26, for connecting the variable volume chamber, 3, to the air delivery ports, 24. The air inlet connecting means, 26, comprises a unidirectional flow apparatus, 27, so that the air delivery ports, 24, are gas flow connected to the variable volume chamber, 3, only during compression time intervals. Check valves or mechanically driven and suitably timed valves can be used as a unidirectional flow apparatus.

10. At least one, and preferably several, hot gas delivery ports, are distributed around the periphery of the primary reaction chamber, 7, at the ash collection end, 11, thereof, with inlets from the primary reaction chamber, 7. The outlets from these hot gas delivery ports, 28, are connected together, as via a manifold, 29, to the hot Bas outlet means for connecting 30, the variable volume chamber, 3, to the hot Bas delivery ports, 28. The hot gas outlet connecting means, 30, comprises a unidirectional flow apparatus, 32, so that the hot gas delivery ports, 28, are gas flow connected to the variable volume chamber, 3, only during expansion time intervals.

11. These arrangements of the connecting means, 26, 30, and unidirectional flow apparatus 27, 32, cause air to flow from the variable volume chamber, 3, into the primary reaction chamber, 7, during compression time intervals, and hot gas products to flow from the primary reaction chamber, 7, into the variable volume chamber, 3, during expansion time intervals, Thus the flow of both reactant air and reacted hot gases is always in the same direction through the primary reaction chamber, 7, and this gas flow direction is largely the same as the char fuel motion direction, 12. Such unidirectional gas flow is also described in my earlier filed, cross referenced, U.S. Patent application, Ser. No. 08/223,665, and this material is incorporated herein by reference thereto.

D. Operation of the Invention

The particular form of this invention shown in FIGS. 1, 2, and 3, operates as follows following starting.

12. In addition to the char fuel preheat and volatile matter distillation zone, 17, at the refuel end, a, of the primary reaction chamber, 7, an ash and ceramic chips collection zone, 39, is created at the ash collection end, 11, of the primary reaction chamber, where all of the solid burnable portions of the char fuel have been consumed. When char fuels containing volatile matter are used, two additional reaction zones are created between the char fuel preheat zone, 17, and the ash and ceramic chips collection zone, 39. The volatile matter emerging from the char fuel in the preheat zone, 17, is mixed with incoming air from the upper air delivery ports, 24, and this air-fuel mixture then burns to combustion products in the volatile matter burnup zone, 40. This volatile matter burnup process not only burns tar materials but also uses up oxygen which entered the refuel end of the reactor. Accordingly first additional air portions and thus additional oxygen, are put inside the primary reactor by the additional air delivery ports, 24, distributed along the length of the primary reactor. This first additional air then reacts with the devolatized char fuel in the producer gas zone, 41, where fuel carbon is gasified to carbon monoxide, a fuel gas. Second additional air portions, and thus second additional oxygen, are put inside the primary reactor by the air delivery ports, 24, to mix with and burn completely the producer gas and other fuel gases flowing out of the producer gas zone, 41. This final burnup of gaseous fuel components takes place within the interstitial spaces among the ceramic chips in the ceramic chips and ash collection zone, 39, which thus becomes also a final burnup zone. The gaseous products of final burnup leave the primary reactor via the hot gas delivery ports, 28.

13. Needed air, and hence oxygen, are distributed across most of the cross sectional area of the primary reactor, as well as along the length of the primary reactor, during compression time intervals, by the combination of the following features:

a. The use of several air delivery ports distributed both along the length and around the periphery of the primary reactor;

b. The use of reactor taper, with cross sectional area increasing in the direction of char fuel motion, 12, which is also the direction of air and gas motion within the reactor;

In this way the air delivery ports, 24, are distributed, not only along the length and around the periphery, but also over most of the cross sectional area of the primary reactor.

14. Within the pore spaces of the porous ceramic chips, premixed with the char fuel chunks, air and gases containing oxygen are stored during compression time intervals when the pressure is rising. During expansion time intervals, when the pressure is dropping, the oxygen, thusly stored inside the ceramic chips, emerges to supply the oxygen then needed for burnup of the fuel gas components concurrently emerging from the char fuel pores.

15. Carbon monoxide, one of the principal fuel gas components emerging from the producer gas zone, 41, has a rather low flame speed and burning velocity. By burning these fuel gas components in the presence of hot char fuel and hot ceramic chips, a distributed source of ignition is provided, with consequently short flame paths. In this way rapid burnup of all fuel components is achieved, as is needed for reasonably high engine speeds.

16. As oxygen containing gas flows through the interstitial spaces between the char fuel chunks and the ceramic chips, some oxygen is depleted therefrom when passing over the outer surface of the char fuel chunks by reaction therewith. But gases passing over the outer surface of the ceramic chips is not thusly oxygen depleted. In this way the premixing of the char fuel chunks with the ceramic chips creates a deeper penetration of oxygen for reaction into the hot char fuel bed within the primary reaction chamber.

17. Were the direction of gas flow through the primary reactor to be reversed from the char fuel motion direction, this would bring into the char fuel preheat and volatile matter distillation zone gases largely depleted of oxygen. Under such reversed flow, burnup of the emerging volatile matter and accompanying tar would be impossible. For this reason the flow of gas through the primary reactor is to be essentially in the same direction as the char fuel motion throughout both the compression time interval and the expansion time interval. This result is achieved by the two unidirectional flow apparatus, 27, 32.

18. The porous ceramic chips are needed to create a final burnup zone, 39, where the ceramic chips and ash collect after the solid char fuel has been removed therefrom by previous reaction and gasification. The final burnup zone lies within the interstitial spaces between these ceramic chips collected in the final burnup zone, 39.

19. Within the volatile matter burnup zone, 40, the producer gas zone, 41, and the final burnup zone, 39, very high temperatures will exist, since the oxidation reactions taking place there are highly exothermic. These high temperatures will exceed the ash fusion temperatures of many char fuel ashes and thus the burned out ashes will frequently be in a molten state. During compression process time intervals molten ash will be forced inside the pore spaces of adjacent ceramic chips and can then be removed conveniently with the solid ceramic chips. To be useful in thus capturing the fuel ash components, the ceramic chips need to be porous and have a melting temperature well above the maximum temperatures prevailing inside the primary reaction chamber. Various ceramic materials are suitable for the purposes of this invention, such as the oxides of zirconium, aluminum, calcium, and magnesium.

20. Within the spaces occupied by the chunks of char fuel and the porous ceramic chips, two types of spaces exist. Within each char fuel chunk and ceramic chip, interior pore spaces exist. Between the char fuel chunks and ceramic chips, interstitial spaces exist. For a char burning engine we prefer a low resistance to gas flow through the primary reactor, since any pressure drop during gas flow through the reactor is irreversible and reduces engine efficiency. Larger char fuel chunks, together with larger ceramic chips, create fewer interstitial spaces. But these fewer spaces are of greater individual cross sectional area and of smaller ratio of periphery to area and thus of lower resistance to gas flow. For this reason we prefer to use char fuel chunks and porous ceramic chips whose size is as large as the refuel mechanism and the ash removal mechanism can reliably handle. The effect of chunk and chip size distribution about a mean value, on gas flow resistance, is at present unpredictable. But if the sizes are distributed rather narrowly about the mean value, the distribution exerts only a minor effect on gas flow resistance.

21. In these various ways several beneficial objects can be achieved by use of the devices of this invention, as, for example, the following:

a. Tars, formed from char fuels containing volatile matter, can be burned to gas products within the primary reactor. Nevertheless a deep, and large volume primary reactor is not needed. Hence reasonably high engine compression ratios can be used with high resulting engine efficiency.

b. Slow burning carbon monoxide in air mixtures can be burned quickly by use of the distributed ignition source of the hot char fuel and ceramic chips. Thus a secondary reaction chamber, with separate igniter is not needed.

c. Fuel ash components can be captured within the pore spaces of the ceramic chips and readily removed from the primary reactor with these chips.

E. Ash Removal Mechanisms

One particular example of an ash removal mechanism suitable for use with this invention is partially shown in FIG. 4 and comprises the following:

a. An ash removal plate, 42, has a fixed volume ash removal cavity, 43, and is driven via the ash drive bar, 44, by the ash removal driver, 23.

b. The ash removal volume, 43, is aligned sealably with the ash collection end, 11, of the primary reaction chamber, 7, at all times except when an ash removal process occurs.

c. The ash removal driver, 23, comprises an ash removal driver piston, 45, operative within a cylinder, 46, and connected to the drive bar, 44. Application of pneumatic or hydraulic pressure to the collect end, 47, of the cylinder, 46, places the ash removal volume, 43, in alignment with the ash collection end, 11, of the primary reaction chamber, 7. Application of pressure to the dump end, 48, of the cylinder, 46, places the ash removal volume, 43, in alignment with the ash dump driver piston, 49, and also the ash dump port, 50.

d. The ash dump driver piston, 49, is driven by the piston, 51, operative within the cylinder, 52, to force ashes and ceramic chips from the ash removal volume, 43, out via the ash dump port, 50, by application of pneumatic or hydraulic pressure to the dump side, 53, of the cylinder, 52. The piston, 51, is retracted outside the ash removal volume, 43, by application of pressure to the retract side, 54, of the cylinder, 52. This dump and retract operation of the ash dump driver piston is timed to occur only when the ash removal volume, 43, is aligned with both the ash dump driver piston, 49, and the ash dump port, 50.

e. Each ash removal process occurs at intervals and occupies an ash removal process time interval during which the ash removal plate, 42, is moved from alignment with the ash collection end, 11, into alignment with the ash dump driver piston, 49; the ash dump driver piston forces ashes and ceramic chips out via the ash dump port, 50; the ash dump driver piston, 49, is fully retracted; and the ash removal plate is restored into alignment with the ash collection end, 11, of the primary reaction chamber, 7.

Other types of ash removal mechanisms can also be used for the purposes of this invention such as are described in the material incorporated herein by reference.

F. Control of Char Fuel Burnout Level

As the char fuel is consumed the ceramic chips accumulate in the primary reactor and must be removed periodically to make room for addition of fresh char fuel premixed with ceramic chips. In principal such periodic ash removal and refueling could be initiated by hand, as when engine torque decreased due to lack of adequate char fuel quantity within the primary reactor. Very preferably, however; initiation of an ash removal process is done automatically by use of a burnout level sensor as an input to a controller operative upon the ash removal drive means. The term burnout level is defined herein and in the claims to mean that level within the primary reaction chamber where all burnable portions of the char fuel have been burned to ashes. Note that the term ashes may include otherwise burnable fragments of char fuel rendered unburnable by encapsulation within molten ash.

Various sensors for sensing the burnout level can be used for the purposes of this invention of which the following are examples:

a. Devolatized char fuels are electrically conductive and thus electrical conductivity sensors could be used to detect where char fuel was no longer present across the area of the primary reactor and this level would be the burnout level.

b. Devolatized char fuels absorb microwaves readily but ceramic chips do not. Thus the burnout level can be sensed as that level above which a microwave beam is appreciably weakened by absorption in char fuel and below which a microwave beam is not thus weakened since it passes through ceramic chips alone. Such a microwave sensor scheme is shown schematically in FIG. 1 and comprises: microwave beam sources, 55; microwave beam intensity detectors, 56, placed across the primary reactor from the sources, 55, at the intended position of the burnout level, 57.

A burnout level controller, 58, responsive to the burnout level sensor, 55, 56, operates upon the ash removal driver, 23, to initiate an ash removal process whenever the burnout level rises above the intended burnout level, 57, away from the ash removal end, 11, of the primary reaction chamber, 7. The intended burnout level, 57, is positioned at least one and preferably more than one ash removal volume inside the primary reaction chamber away from the ash removal end, 11. In this way an adequate final burnup zone, 39, will be obtained in the interstitial spaces between the ceramic chips collected at the ash collection end, 11, and there free of char fuel particles. Upon completion of each such ash removal process the primary reaction chamber contents volume will have been reduced by one ash removal volume. This deficiency in reaction chamber contents will be promptly replaced by action of the refuel driver piston, 35, forcing fresh char fuel premixed with ceramic chips, out of the refuel cavity, 34, and into the refuel end, 8, of the primary reaction chamber, 7. When the refuel driver piston, 37, reaches the end of its delivery stroke, a refuel process is initiated, as for example by a stroke end sensor, 58, and refuel initiation controller, 59, acting on the refuel drive means, 22. Following the refuel process the refuel cavity, 34, will have been refilled from the blender final receiving hopper, 66, and have been returned into alignment with the refuel driver piston, 37, and the refuel end, 8, of the primary reaction chamber, 7. In this way the burnout level sensor and control functions to hold the burnout level at the intended burnout level, 57, and to keep the primary reaction chamber filled with char fuel chunks and ceramic chips and under compression.

G. Ceramic Chips to Char Fuel Ratio Control

As the volumetric ratio of porous ceramic chips to char fuel chunks, in the premixed material being inserted into the primary reaction chamber is increased, oxygen will penetrate more deeply into the volatile matter burnup zone, 40, and into the producer gas zone, 41, and also into the final burnup zone, 39. At sufficiently high values of the volumetric ratio of ceramic chips to char fuel oxygen penetration will exceed oxygen required for reaction and the oxygen content of the gases leaving the primary reactor, and thus the oxygen content of the engine exhaust gases, will increase. In effect the excess air quantity will have been increased beyond that needed for maximum char fuel burnup, and this unneeded excess air acts to reduce engine efficiency. The term oxygen limit is used herein and in the claims to mean that engine exhaust gas oxygen content obtained when unneeded excess air is being passed through the primary reactor as a result of too high a value of the volumetric ratio of ceramic chips to char fuel.

As the volumetric ratio of porous ceramic chips to char fuel chunks is decreased the depth of oxygen penetration into the contents of the primary reaction chamber is decreased. An oxygen deficiency, if created in this manner, will occur first in the deepest zone, the final burnup zone, 39, and portions of the carbon monoxide from the producer gas zone, 41, will escape unreacted from the primary reaction chamber, and thus the carbon monoxide content of the engine exhaust gas will increase. This unburned carbon monoxide decreases the fuel efficiency of the engine. The term carbon monoxide limit is used herein and in the claims to mean that engine exhaust carbon monoxide content obtained when engine efficiency is reduced as a result of too low a value of the volumetric ratio of ceramic chips to char fuel.

Preferably the volumetric ratio of ceramic chips to char fuel chunks is set below the oxygen limit and above the carbon monoxide limit.

Preferably the desired volumetric ratio of porous ceramic chips to char fuel chunks is set into the blender and its apparatus for setting this volumetric ratio, 21. This setting can be done by hand and left unchanged when the properties of the char fuel and ceramic chips do not vary appreciably from one batch to the next. But char fuels often vary appreciably even when drawn from the same coal mine. Thus an automatic apparatus for setting the proper volumetric ratio of ceramic chips to char fuel may be preferred in some engine uses.

One particular example of a blender for premixing the ceramic chips together with the char fuel chunks, and comprising a apparatus for setting the volumetric ratio, 21, of ceramic chips to char fuel is shown partially in FIG. 5A and FIG. 5B and comprises the following:

1. The char fuel source, 18, and the ceramic chips source, 19, feed these materials into a transfer valve, 60, whose cavity volume, 61, is fitted with a moveable block, 62, of fixed size.

2. Rotating the transfer valve, 60, about its centerline, 65, as by the driver, 63 or by hand, transfers a volume of material from the sources, 18, 19, into the mixer, 20, where the transferred particles mix together. The volume thus transferred on each rotation of the valve, 60, is constant since the volume of the cavity, 61, and the moveable block, 62, are constant. But the relative volumes of ceramic chips to char fuel chunks can be changed by moving the block, 62, within the cavity, 61. When the block, 62, is largely beneath the ceramic chips source, 19, a small volume of ceramic chips is transferred together with a large volume of char fuel, thus creating a low value of the volumetric ratio of ceramic chips to char fuel. A high value of the volumetric ratio of ceramic chips to char fuel results similarly with the moveable block, 62, is largely beneath the char fuel source, 18. The position of the block, 62, within the cavity, 61, can be adjusted via the block driver, 64, as by hand, or preferably automatically.

3. From the premixer the ceramic chips and char fuel pass into the blender final receiving hopper 66, and thence into the refuel cavity, 34, during the refuel process. The hopper, 66, can be kept filled either by hand operation of the transfer valve, 60, or by automatic operation thereof by a hopper level control, 67, responsive to a solids level sensor, 68, on the blender final receiving hopper, 66.

4. Automatic control of the volumetric ratio of ceramic chips to char fuel chunks can be achieved by use of an engine exhaust gas composition sensor, 69, as input to a controller, 70, which operates upon the block driver, 64. In most cases the exhaust gas oxygen content can be sensed and the controller, 70, then operates the block driver, 64, so that the volumetric ratio of ceramic chips to char fuel is decreased when engine exhaust gas oxygen content exceeds a selected value and this volumetric ratio is increased when engine exhaust gas oxygen content is below the selected value. A similar scheme of automatic control could be used wherein the engine exhaust gas content of carbon monoxide was sensed and the controller adjusted the volumetric ratio of ceramic chips to char fuel to hold carbon monoxide content to a selected range of values. Generally, however, a control scheme using engine exhaust gas oxygen content is preferred since efficiency losses due to unneeded excess air are less than efficiency losses due to unburned carbon monoxide.

5. Stops, 71, 72, are placed on the block, 62, so that the volumetric ratio of ceramic chips to char fuel always exceeds the volumetric ratio of char fuel ash content to ceramic chips pore content so that ceramic pore space is available to contain all of the molten char fuel ash. The stops, 71, 72, also assure that at least some char fuel is always present in the premixed ceramic chips and char fuel material going into the primary reactor.

H. Air and Hot Gas Storage Reservoirs

When char fuels of high volatile matter content are being used, a supply of extra air may be needed during expansion to supplement that stored in ceramic chip pore spaces. This extra air supply may be needed, not only to react with the extra volatile matter, but also to assure that all carbon monoxide emerging from the producer gas zone during expansion is fully burned to carbon dioxide. This extra air supply can be stored in a reactant gas storage reservoir, 73, during compression time intervals. This reactant gas storage reservoir, 73, is connected to the inlets of the air delivery ports, 24, as via the air manifold, 25, and connection, 26. During expansion time intervals the extra air stored in the reservoir, 73, flows through the primary reaction chamber, 7, as the pressure drops, and thus supplies the extra oxygen needed for reaction with both emerging fuel volatile matter and emerging carbon monoxide.

An extra supply of reactant air may also be supplied into the primary reactor, 7, during compression time intervals, by increasing the volume of the final burnup zone, 39, and also by adding a burned gas storage reservoir, 74, which is connected to the outlets of the hot gas delivery ports, 28, as via the manifold, 29. During compression process time intervals extra air flows into and through the primary reaction chamber, 7, in order to pressurize these increased volumes. The burned gas storage reservoir can also be constructed so as to function additionally as a separator of solid particles from the hot gases.

Such use of air storage reservoirs, 73, and burned gas storage reservoirs, 74, has been described previously in the material incorporated herein by reference, and also in the cross referenced related applications.

I. Types of Porous Ceramic Chips

Portions of the ceramic chips used can be reactive basic materials, such as porous limestone or dolomite, for the purpose of capturing sulfur and nitrogen acids formed during the burnup of the char fuel. In this way engine exhaust gas emissions of these undesirable sulfur and nitrogen acids can be reduced. Porous basic ceramics will be particularly effective for such acid capture since portions of the burned gases are forced by compression into the pore spaces where acid capture occurs readily. If the reactive basic ceramic chips are of a different size than the other, non reactive, ceramic chips, the reacted basic chips can be separated from the non reactive chips after removal from the primary reactor by screening or other separating means, 75. The non reactive chips, thusly separated can then be recirculated by a recirculator, 76, back into the source of ceramic chips for reuse. The separated and reacted basic ships can be discarded, 77.

Those porous ceramic chips whose pore spaces become occupied with fused fuel ash can be separated from those porous ceramic chips not thusly filled with fused ash by density separation methods. Those ceramic chips filled with ash will be of greater density than those not so filled. Flotation separation methods are an example density separation scheme. The separated, non ash filled ceramic chips can then be recirculated back into the source of ceramic chips for reuse.

Detailed descriptions of separating apparatus for separating particles differing in size are presented in, *Principles of Chemical Engineering*, Walker, Lewis, McAdams, and Gilliland, McGraw Hill, Third Ed., 1937, page 289 to page 302. Additional descriptions of separating apparatus for separating particles differing in density are presented in the same reference, page 302 to page 312.

Recirculation of ceramic chips can be done by hand or, preferably, automatically, by use of such well known apparatus as bucket or belt or screw conveyors.

The porous ceramic chips can acquire catalytic properties to promote selected reactions of the char fuel burning process. Some naturally occurring ceramic materials already possess catalytic properties. Catalyst materials can be added into the ceramic at original manufacture or can be plated on to the surfaces of the ceramic. Such catalytic ceramic chips may be preferred for use in higher speed engines in order to speed up some of the otherwise slower reactions, such as the final burnup of carbon monoxide.

What I claim is:

1. In a cyclic char burning engine comprising: at least one combined means for compressing and expanding gases, each said combined means comprising; an internal combustion engine mechanism comprising a variable volume chamber for compressing and expanding gases, and drive means for driving said internal combustion engine mechanism and for varying the volume of said chamber through repeated cycles, each cycle comprising a compression time interval followed by an expansion time interval, each said combined means for compressing and expanding further comprising, intake means for admitting reactant gases into said variable volume chamber prior to each said compression time interval, exhaust means for removing reacted gases from said variable volume chamber after each said expansion time interval; each said combined means for compressing and expanding having at least two separate gas flow connections to a separate primary reaction chamber within enclosing walls and a pressure vessel container; said char burning engine further comprising a source of supply of reactant gas containing appreciable oxygen gas to each said intake means for admitting reactant gases into said variable volume chamber; said char burning engine further comprising means of cranking said internal combustion engine mechanism when said char burning engine is being started; each said separate primary reaction chamber comprising; a refuel end with a refuel mechanism means for inserting fresh char fuel particles into said refuel end, an ash removal end, a char fuel direction of motion from said refuel end toward said ash removal end, each said primary reaction chamber further comprising, a char fuel preheat zone positioned toward said refuel end of said primary reaction chamber, an ash collection zone positioned toward said ash removal end of said primary reaction chamber, and rapid reaction zones positioned between said char fuel preheat zone and said ash collection zone; each said primary reaction chamber further comprising at least one ash removal means for removing unburned materials from said ash removal end; each said primary reaction chamber further comprising means for preheating the contents within said primary reaction chamber when said char burning engine is being started;

an improvement to each said primary reaction chamber, comprising:

a source of char fuel chunks;

a source of porous ceramic chips;

premixing means for premixing said char fuel chunks and said porous ceramic chips together;

wherein said premixing means for premixing said char fuel chunks and said porous ceramic chips together further comprises means for setting the volumetric ratio of porous ceramic chips to char fuel to exceed the ratio of char fuel ash volume content to ceramic chip pore volume content, and to be finite;

wherein said refuel mechanism means for inserting fresh char fuel particles into said refuel end of said primary reaction chamber comprises means for inserting premixed char fuel chunks and porous ceramic chips together from said premixing means into said primary reaction chamber; and said refuel mechanism means for inserting further comprises refuel drive means for driving said means for inserting and comprising apparatus adapted to carry out said insertion over a refuel time interval, and to apply a compression force to the contents of said primary reaction chamber at all times when said char burning engine is running except during said refuel time intervals;

wherein said ash removal means for removing unburned materials from said ash removal end of said primary reaction chamber further comprises means for removing ceramic particles and ashes together from said primary reaction chamber, and comprising ash removal drive means for driving said means for removing and comprising apparatus adapted to carry out said removal over an ash removal time interval;

wherein said primary reaction chamber is tapered in the direction of char fuel motion with reaction chamber cross section area at right angles to the direction of char fuel motion increasing in the direction of char fuel motion;

wherein said primary reaction chamber further comprises several air delivery ports through the enclosing walls of said primary reaction chamber, and these air delivery ports positioned along the length of said primary reaction chamber in the direction of char fuel motion, and also positioned around the periphery of said primary reaction chamber at right angles to the char fuel motion direction, each said air delivery port comprising an outlet end into said primary reaction chamber and an inlet end;

air inlet means for connecting said variable volume chamber to said air delivery port inlets so that said air delivery port inlets are connected to said variable volume chamber only during said compression time intervals;

wherein said primary reaction chamber further comprises at least one hot gas delivery port through the enclosing walls of said primary reaction chamber, and these hot gas delivery ports positioned at the ash removal end of said primary reaction chamber, and these hot gas delivery ports preferably positioned around the periphery of said primary reaction chamber at right angles to the char fuel motion direction, each said hot gas delivery port comprising an inlet end into said primary reaction chamber and an outlet end;

hot gas outlet means for connecting said variable volume chamber to said hot gas delivery port outlets so that said hot gas delivery port outlets are connected to said variable volume chamber only during said expansion time intervals.

2. A cyclic char burning engine as described in claim 1 and further comprising:

burnout sensor means for sensing the burnout level in said primary reaction chamber where char fuel is fully burned to ashes;

burnout level control means for controlling said ash removal means for removing unburned materials from said primary reaction chamber, and for controlling said refuel mechanism means for inserting char fuel and ceramic chips into said primary reaction chamber, and responsive to said burnout sensor means for sensing the burnout level in said primary reaction chamber, and operative upon said ash removal drive means for driving said means for removing and also operative upon said refuel drive means for driving said means for inserting, to maintain said burnout level outside said ash removal means for removing and also outside said refuel mechanism means for inserting, and also to maintain said primary reaction chamber filled with ceramic chips and char fuel.

3. A cyclic char burning engine as described in claim 2:

wherein said ash removal means for removing materials from said primary reactor has a fixed ash removal volume and is controlled by said burnout level control means to remove materials periodically at intervals;

wherein said burnout level is controlled by said burnout level control means to remain at least one volume, equal to said ash removal volume, inside said primary reaction chamber in the direction of said refuel end away from said ash removal end;

and further wherein said burnout level is controlled by said burnout level control means to remain at least one volume, equal to said ash removal volume, inside said primary reaction chamber in the direction of said ash removal end away from said refuel end.

4. A cyclic char burning engine as described in claim 1 and further comprising:

an engine exhaust gas sensor means for sensing the oxygen content of the engine exhaust gas;

control means for controlling the volumetric ratio of ceramic chips to char fuel being inserted together into said primary reaction chamber, and responsive to said engine exhaust gas sensor means, and operative upon said means for setting the volumetric ratio of ceramic chips to char fuel, to maintain said engine exhaust gas oxygen content below the oxygen limit.

5. A cyclic char burning engine as described in claim 1:

wherein said porous ceramic chips in said source of ceramic chips comprise at least two differing kinds of ceramic chips, said ceramic chips differing both in size and in chemical composition;

and further comprising:

size means for separating removed ceramic chips into at least two separated batches differing in size;

means for recirculating at least one of said at least two separated batches of removed ceramic chips, differing in size, back into said source of ceramic chips.

6. A cyclic char burning engine as described in claim 1 and further comprising:

density means for separating removed ceramic chips into at least two separated batches differing in density, means for recirculating at least one of said at least two separated batches of removed ceramic chips, differing in density, back into said source of ceramic chips.

7. A cyclic char burning engine as described in claim 1 and further comprising;

a reactant gas storage reservoir for storing reactant gas containing appreciable oxygen gas and comprising a reactant gas inlet and a reactant gas outlet;

said reactant gas inlet and outlet of said reactant gas storage reservoir being connected to said air delivery port inlets.

8. A cyclic char burning engine as described in claim 1 and further comprising:

a burned gas storage reservoir for storing burned gases and comprising a burned gas inlet and a burned gas outlet;

said burned gas inlet of said burned gas storage reservoir being connected to said hot gas delivery port outlets;

said burned gas outlet of said burned gas storage reservoir being connected to said hot gas outlet means for connecting said variable volume chamber to said hot gas delivery port outlets.

9. A cyclic char burning engine as described in claim 1 and further comprising:

an engine exhaust gas sensor means for sensing the carbon monoxide content of the engine exhaust gas;

control means for controlling the volumetric ratio of ceramic chips to char fuel being inserted together into said primary reaction chamber, and responsive to said engine exhaust gas sensor means, and operative upon said means for setting the volumetric ratio of ceramic chips to char fuel to maintain said engine exhaust gas carbon monoxide content below the carbon monoxide limit.

* * * * *